United States Patent [19]

Sumii et al.

[11] Patent Number: 5,478,361
[45] Date of Patent: Dec. 26, 1995

[54] DYEING METHOD

[75] Inventors: Masaaki Sumii, Sakai; Yasuyuki Yoshimura, Ibaraki, both of Japan

[73] Assignee: Sakura Color Products Corporation, Osaka, Japan

[21] Appl. No.: 193,401

[22] Filed: Feb. 7, 1994

[30] Foreign Application Priority Data

Feb. 5, 1993 [JP] Japan .................................. 5-018301

[51] Int. Cl.$^6$ ............................. C09B 67/00; D06P 5/00
[52] U.S. Cl. ......................... 8/554; 8/557; 8/558; 8/559; 8/560; 8/568; 8/588; 8/589; 8/602; 8/604; 8/637.1
[58] Field of Search ....................... 8/554–556, 557–560, 8/602–606, 594–601, 588–592, 637.1, 918, 921

[56] References Cited

U.S. PATENT DOCUMENTS

| | | | |
|---|---|---|---|
| 2,123,154 | 7/1938 | Schum | 8/606 |
| 4,362,874 | 12/1982 | Kalk et al. | 544/317 |
| 4,369,041 | 1/1983 | Dvorsky et al. | 8/532 |
| 5,133,779 | 7/1992 | Topfl | 8/606 |
| 5,252,103 | 10/1993 | Kamata et al. | 8/554 |

*Primary Examiner*—Margaret Einsmann
*Attorney, Agent, or Firm*—Larson & Taylor

[57] ABSTRACT

The invention provides the following dyeing method: A method of dyeing a cellulosic textile article characterized by immersing the article in an aqueous dispersion containing a cation-treated coloring agent in the first place and, then, immersing it in an aqueous solution or dispersion of an anionic compound.

18 Claims, No Drawings

DYEING METHOD

FIELD OF THE INVENTION

This invention relates to a method for dyeing textile articles, particularly cellulosic fiber products, with ordinary inorganic, organic or fluorescent coloring agents.

BACKGROUND OF THE INVENTION

For the coloration of cellulose fiber-containing articles with an inorganic, organic or fluorescent coloring agent, there is known the method which comprises treating a cellulose fiber-containing textile substrate with a cationic compound in the first place and, then, immersing it in an aqueous solution containing a coloring agent and an anionic compound (Japanese Patent Application Kokai H-4-263678).

However, it is difficult, by the above prior art method, to uniformly treat a textile substrate with a cationic compound and the resultant uneven deposition of the coloring agent results in color shading and agglomeration problems. Moreover, because the coloring agent is anionic, the substrate is not fully covered with the anionic compound in the subsequent fixation treatment. This leads to a decrease in the color fastness to washing (laundering fastness) or the detachment of the coloring agent during laundering. Furthermore, in causing the cation-treated substrate to absorb the anionic coloring agent, the coloring agent tends to agglomerate due to interaction of charges so that no satisfactory dyeing effect can be obtained.

SUMMARY OF THE INVENTION

The primary object of this invention is to provide a method by which cellulosic textile substrates can be dyed uniformly and without fail.

This invention is directed to a method of dyeing a cellulosic substrate with a coloring agent characterized by immersing the substrate in an aqueous dispersion containing a cation-treated coloring agent and, then, immersing the substrate in an aqueous solution or dispersion containing an anionic compound.

DETAILED DESCRIPTION OF THE INVENTION

This invention is based on the discovery that when a cellulosic substrate is colored in a herein-defined process using a coloring agent which has been treated with a cation, not only high dyeability but also excellent laundering fastness can be realized.

This invention is now described in detail.

To begin with, the cellulosic substrate is immersed in an aqueous dispersion containing a cation-treated coloring agent. This aqueous dispersion can be prepared by dispersing the cation-treated coloring agent in water.

The substrate to which the dyeing method of this invention can be applied includes any and all cellulosic textile articles. Thus, for example, said substrate includes (a) textile articles fabricated using one or more cellulosic fibers, viz. natural cellulose fibers such as cotton, linen and other fibers, regenerated cellulose fibers such as rayon, cuprammonium rayon and other fibers, and semisynthetic fibers such as acetate and triacetate fibers, (b) textile articles made of blend yarns of a cellulosic fiber with a synthetic fiber such as polyamide, polyester, acrylic and other fibers, and (c) textile articles made of blend yarns of said cellulosic fibers with wool fiber. As regards the form of article, any of yarns, woven cloths, knitted fabrics, nonwoven fabrics, etc. can be employed. Prior to said immersion treatment, the textile substrate is preferably washed thoroughly with a commercial detergent.

The cation-treated coloring agent is now described. There is no limitation on the method of preparing the cation-treated coloring agent but depending on the initial form of coloring agent, the following procedures can, for instance, be followed.

(A) Where the coloring agent is a powder, the powder is dispersed in an aqueous solution or dispersion containing a cationic compound in the usual manner. The amount of the coloring agent relative to the aqueous solution or dispersion of said cationic compound is about 10–50% by weight, preferably 25–40% by weight, on a nonvolatile matter basis.

(B) Where the coloring agent is an anionic or nonionic aqueous dispersion, the dispersant is first removed from the surface of the coloring agent and the dispersion medium. This removal can be effected by diluting the dispersion with water and filtering or centrifuging the dilution. The amount of water required for dilution is preferably about 10–50 times, particularly 20–30 times, the volume of said dispersion. Then, just as in the above procedure (A), the recovered coloring agent is mixed with an aqueous solution or dispersion containing a cationic compound in the per se known manner.

(C) Where the coloring agent is a cationic aqueous dispersion, the dispersion can be used as it is but is preferably diluted with water and subjected to cation treatment as in the above procedure (B).

The coloring agent is not limited in kind provided that it can be used for textile coloring purposes. For example, the following coloring agents can be used alone or in combination.

(a) Inorganic pigments such as zinc bloom, titanium dioxide, cadmium yellow, zinc yellow, nickel-titanium yellow, yellow lead, red iron oxide, cadmium red, molybdenum red, prussion blue, ultramarine blue, cobalt blue, emerald green, Guignet's green, carbon black, iron black, etc.

(b) Organic dyes such as diazo yellow, Hansa yellow, Benzidine yellow, fast yellow, pyrazolone orange, diazo orange, benzidine orange, naphthol red, parared, permanent red, quinacridone red, dioxazine violet, thioindigo violet, phthalocyanine blue, phthalocyanine green, etc.

(c) Other coloring agents and fluorescent colors including commercial fluorescent agents (d) Functional dyes such as photochromic dyes, thermochromic dyes, etc.

As the above-mentioned aqueous solution or dispersion of a cationic compound, aqueous solutions or dispersions of quaternary ammonium salts, pyridinium salts, amine salts or the like can be mentioned.

The quaternary ammonium salts mentioned above may, for example, be (a) alkyltrimethylammonium chlorides of the formula $RN(CH_3)_3Cl$ (where R represents an alkyl group of 8–18 carbon atoms), (b) alkyldimethylbenzylammonium chlorides of the formula $C_6H_5CH_2RN(CH_3)_2Cl$ (wherein R represents an alkyl group of 12–18 carbon atoms), (c) quaternary ammonium salts of acrylic and methacrylic acids, (d) quaternary ammonium salts of polyacrylic and polymethacrylic acids, (e) quaternary ammonium salts of acrylic acid- or methacrylic acid-vinyl compound copolymers, (f) quaternary ammonium salts containing a triazine ring, and (g) said alkyltrimethylammonium chlorides (a) or alkyldimethylbenzylammonium chlorides (b) wherein R contains an ether, ester or amide bond, among others.

The pyridinium salts may, for example, be (a) alkylpyridinium chlorides of the formula

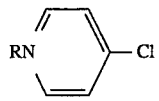

(wherein R represents an alkyl group of 12–18 carbon atoms) and (b) said alkylpyridinium chlorides (a) wherein R contains an ether, ester or amide bond, among others.

The amine salts may, for example, be (a) primary amine salts of the formula $H_2 \cdot HCl$ (wherein R represents an alkyl group of 8–18 carbon atoms), (b) secondary amine salts of the formula $RNHCH_2CH_2OH$ (wherein R represents an alkyl group of 8–18 carbon atoms), (c) tertiary amine salts of the formula $RN(CH_2CH_2OH)_2$ (wherein R represents an alkyl group of 8–18 carbon atoms), (d) tertiary amine polymers such as polyacrylonitrile and other polymers, (e) aminoethylimidazoline hydrochloride, (f) condensates of polyalkylene polyamines with quanidine derivatives, and (g) said primary amines (a), secondary amines (b) and tertiary amines (c) in which R contains an ether, ester or amide bond, among others.

As other examples of the cationic compound, there can be mentioned various cationic resins such as cationic urea resin, cationic melamine resin, cationic polyamide resin, cationic cellulosic resin, cationic polyamide-epihalohydrin resin and so on.

Among these cationic compounds, the quaternary ammonium salts, and cationic resins such as cationic urea resin, cationic urethane resin, etc. are preferred.

The concentration of the cationic compound in said aqueous solution or dispersion is generally about 1–50% by weight and preferably about 10–20% by weight. If the concentration is less than 1% by weight, the cation treatment of the coloring agent cannot be carried through to a satisfactory extent. On the other hand, if the concentration exceeds 50% by weight, the cationic compound will be adsorbed on the fiber to cause the problem of color shading.

The aqueous dispersion containing the cation-treated coloring agent should contain about 0.1–20% by weight, preferably 0.5–10% by weight, of the cation-treated coloring agent based on the substrate and about 5–50 parts by weight (bath ratio 1:5–1:50), preferably 10–30 parts by weight (bath ratio 1:10–1:30), of water based on the substrate. The immersion treatment is carried out at a temperature from room temperature to about 80° C., preferably about 60°–70° C., for about 5–30 minutes, although deviations from these ranges are tolerated depending on the type of substrate, the type and amount of coloring agent and the desired characteristics of the product.

As a second step, the textile substrate treated with the above dispersion is immersed in an aqueous solution or dispersion of an anionic compound.

The anionic compound mentioned above includes anionic surfactants and anionic polymers.

The anionic surfactants may, for example, be (a) fatty acid salts of the formula RCOOM (wherein R represents an alkyl group of 8–18 carbon atoms; M represents potassium or sodium), (b) higher alcohol sulfate ester salts of the formula $ROSO_3N_a$ (wherein R represents an alkyl group of 8–18 carbon atoms), (c) aliphatic amide sulfate salts of the formula $R^1CONHR^2CH_2CH_2OSO_3N_a$ (wherein $R^1$ and $R^2$ independently represent an alkyl group of 8–18 carbon atoms), (d) aliphatic alcohol phosphate ester salts of the formula $ROP(ON_a)_2$ (wherein R represents an alkyl group of 8–18 carbon atoms), (e) aliphatic amide sulfonate salts of the formula $R^1CONR^2CH_2CH_2SO_3N_a$ (wherein $R^1$ and $R^2$ independently represent an alkyl group of 8–18 carbon atoms), (f) alkylarylsulfonic acid salts of the formula

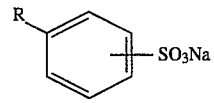

or

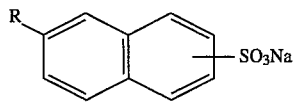

(wherein R represents an alkyl group of 8–18 carbon atoms), and (g) formalin-condensed naphthalenesulfonic acid salts of the formula

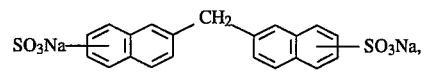

among others.

The anionic polymers may, for example, be starch derivatives [esterified starch (starch acetate, starch sulfate, etc.), etherified starch, etc.], cellulose derivatives (nitrocellulose, acetylcellulose, etc.), gum arabic, alginic acid salts, anionic polyvinyl alcohol, acrylic or methacrylic acid-vinyl compound copolymers, maleic acid- or maleic anhydride-vinyl compound copolymers and so on.

Preferred, among such anionic compounds, are higher alcohol sulfate ester salts, alkylarylsulfonic acid salts and maleic acid- or maleic anhydride-vinyl compound copolymers.

As the anionic compound, synthetic resin binders for use in adhesives can also be employed in this invention. Among such binders can be reckoned low molecular polyethylene, low-melting polyesters, ethylenevinyl acetate copolymer, styrene-butadiene latex, chlorinated rubber, shellac, zein, unsaturated polyester resin, epoxy resin, cellulosic resin, polyurethane resin, phenolic resin, vinyl chloride resin, vinyl acetate resin, silicon resin, polyvinyl alcohol and so on. Moreover, emulsions containing polyvinyl acetate, polyethylene, polyacrylate, styrene resin, butadieneacrylonitrile rubber, polyurethane resin, polyether or the like can also be employed. Particularly preferred, among them, are polyacrylate emulsions, polyurethane resin and polyurethane resin emulsions.

The aqueous solution or dispersion of anionic compound should contain about 5–50 parts by weight (bath ratio 1:5–1:50), preferably about 10–30 parts by weight (bath ratio 1:10–1:30), of water relative to the substrate and about 1–50% by weight, preferably 5–15% by weight, of the anionic compound relative to the substrate.

The immersion conditions may be generally room temperature—about 80° C. and preferably about 60°–70° C. and an immersion time of about 5–30 minutes. However, as in the above coloration procedure, deviations from the above ranges can be tolerated depending on the type of substrate, the type and amount of coloring agent, and the desired characteristics of the product. Moreover, in carrying out the above immersion procedure in the second step, the substrate may be immersed in a bath containing about 1–5% by weight of a known curing agent, such as ethyleneurea, and about 5–50 parts by weight, preferably 20–30 parts by weight, of water, both relative to the substrate, together with said anionic compound, in which case the cured strength of the resin is increased to improve the laundering fastness of the product. The textile article thus treated is washed with water and dehydrated in the conventional manner and, after drying at room temperature, is cured at about 100° to 140° C. for about 5–30 minutes.

In this invention, the cellulosic substrate may be immersed in an aqueous solution or dispersion of an anionic compound prior to immersion in an aqueous dispersion containing the cation-treated coloring agent. This treatment can be conducted in the same manner as the second step described above. The treatment leads to a further improvement in the leveling effect and depth of color.

The coloring method of this invention provides for the following beneficial results.

(1) Since the coloring agent is uniformly distributed throughout the substrate, the problem of color shading and the troubles associated with agglomeration are eliminated.

(2) Since the anionic compound covers and binds the whole surface of the coloring agent, excellent resistance to laundering is insured.

(3) The color concentration is high, with good color effects.

EXAMPLES

The following examples and comparison examples illustrate the advantageous features of this invention with greater clarity. In these examples and comparison examples, all parts and % are by weight.

It should also be understood that the tests referred to in the examples and comparison examples were performed by the following methods.

(1) The agglomeration and color shading after coloring were evaluated by gross observation of the appearance. In Table 1, A represents neither color shading nor agglomeration, B represents color shading without agglomeration, and C represents both color shading and agglomeration.

(2) The depth of color was evaluated by measuring the chromaticity (Lab) values and calculating the color concentration $\Delta E$ value by means of the following equation (the larger the $\Delta E$ value, the higher is the color concentration).

$$\Delta E = [(LH-Lb)^2 + (aH-ab)^2(bH-bb)^2]^{1/2}$$

(wherein LH, aH and bH represent the chromaticity values after coloration and Lb, ab and bb represents the chromaticity values before coloration)

(3) Laundering fastness (color fastness to washing) were evaluated as follows.

The colored T shirt was treated with 2 g/l of Attack® (Kao Corporation), an alkaline detergent, at 50° C. with stirring for 30 minutes and the fabric color $\Delta E'$ value was then determined by the following equation. (The smaller the $\Delta E'$ value is, the greater is the laundering fastness).

$$\Delta E' = [(LS-Lb)^2 + (aS-ab)^2(bS-bb)^2]^{1/2}$$

(wherein LS, aS and bS represent the chromaticity values after the test and Lb, ab and bb represent the chromaticity values before the test).

Preparation of cation-treated color dopes

Prior to the procedures of the Examples, the following cation-treated color dopes A–E were prepared.

(1) Preparation of Color Dope A

Twenty (20) parts of a color powder (phthalocyanine green) was dispersed in 100 parts of a cationic compound aqueous dispersion (15% of tertiary amineacrylate copolymer and 85% of water) to provide cation-treated Color Dope A.

(2) Preparation of Color Dope B

An aqueous color dispersion composed of 25% phthalocyanine green, 2% sodium dodecylbenzenesulfonate (Newrec Paste H, Nippon Oil and Fats Co., an anionic surfactant) and the balance of water was diluted with 20 volumes of water and the dilution was filtered to remove the dispersant from the dye surface and medium. The resultant color was then dispersed in 100 parts of a cationic compound aqueous dispersion composed of 10% cationic urea resin (Uramine P-1500, Mitsui Toatsu Chemicals) and 90% water to provide cation-treated Color Dope B.

(3) Preparation of Color Dope C

Ten (10) parts of an aqueous color dispersion composed of 40% microencapsulated black thermochromic dye (TC Color, Sakura Claypas), 5% anionic dispersant (ethylenemaleic anhydride copolymer) and 55% water was diluted with 20 volumes of water and the resulting dilution was centrifuged to remove the dispersant from the surface of the coloring agent and the dispersion medium. To this color was added 10 parts of a cationic compound aqueous dispersion composed of 10% cationic epoxy polyamide resin (Uramine P-5200, Mitsui Toatsu Chemicals) and 90% water to provide cation-treated Color Dope C.

(4) Preparation of Color Dope D

Fifty (50) parts of an aqueous color dispersion (PYUDYE-W, Dainippon Ink & Chemicals, an organic green color) was mixed with 20 volumes of water and this dilution was filtered to remove the dispersant from the medium and the surface of the coloring agent. Ten (10) parts of this color was dispersed in 100 parts of a cationic compound aqueous dispersion composed of 3% alkylbenzylammonium chloride (Cation F2-35R, Nippon Oil and Fats Co.) and 97% water to provide cation-treated Color Dope D.

(5) Preparation of Color Dope E

Twenty (20) parts of a color powder (phthalocyamine blue) was dispersed in 100 parts of a cationic compound aqueous dispersion (15% polyoxyethylene-octadecylamine and 85% water) to provide cation-treated Color Dope E.

Example 1

One-hundred (100) parts of cotton T-shirts were washed well in a drum dyeing machine using a detergent (nonionic surfactant)-containing water (bath ratio 1:20), rinsed well and dehydrated. Then, the T-shirts were immersed in an aqueous dispersion containing 2000 parts of water and 20 parts of Color Dope A and the bath temperature was gradually increased to 60° C. After 10 minutes of treatment, the shirts were rinsed and dehydrated.

On the other hand, 10 parts of an anionic compound (Cellogen Proof, Dai-Ichi Kogyo Seiyaku Co., a specially formulated carboxymethylcellulose) was mixed with 2000 parts of water (bath ratio 1:20) to prepare an anionic compound aqueous dispersion. The T-shirts treated above were immersed in this dispersion and the temperature was gradually increased to 60° C. After 10 minutes of treatment, the T-shirts were rinsed well, dehydrated and dried using a tumbler at 110° C. for 10 minutes to provide colored T-shirts.

The T-shirts were examined for agglomeration, color shading, depth of color and laundering fastness. The results are shown in Table 1. The T-shirts were further evaluated in regard to handle, feel and crocking fastness. The results were all satisfactory.

Example 2

One-hundred (100) parts of cotton T-shirts were washed as in Example 1. The T-shirts were then immersed in an anionic compound aqueous dispersion prepared by mixing 10 parts of an anionic binder (JSRAE336, Japan Synthetic Rubber Co., a polyacrylate emulsion) with 2000 parts of water (bath ratio 1:20). The bath temperature was gradually increased to 60° C. and the treatment was carried out for 10 minutes. The treated T-shirts were rinsed and dehydrated.

The T-shirts were then treated with an aqueous dispersion containing Color Dope A in the same manner as in Example 1 and further immersed in an anionic compound aqueous dispersion as in Example 1. The treated shirts were rinsed well, dehydrated and tumbler-dried at 110° C. for 10 minutes.

The resulting colored T-shirts were examined for agglomeration, color shading, depth of color and laundering fastness. The results are shown in Table 1. The T-shirts were further evaluated in regard to handle, feel and crocking fastness. The results were all satisfactory.

Example 3

One-hundred (100) parts of cotton T-shirts were washed and treated with an aqueous dispersion containing Color Dope A as in Example 1. The T-shirts were then immersed in an anionic compound aqueous dispersion prepared by mixing 10 parts of an anionic binder (Isopranil DLN, Bayer-Japan, a polyurethane emulsion) with 2000 parts of water (bath ratio 1:20). The bath temperature was increased gradually to 60° C. and the treatment was carried out for 10 minutes. The treated shirts were rinsed well, dehydrated and tumbler-dried at 110° C. for 10 minutes.

The T-shirts were examined for agglomeration, color shading, depth of color and laundering fastness. The results are shown in Table 1. The T-shirts were further evaluated in regard to handle, feel and crocking fastness. The results were all satisfactory.

Example 4

One-hundred (100) parts of cotton T-shirts were washed as in Example 1. The T-shirts were then immersed in an anionic compound aqueous dispersion prepared by mixing 10 parts of an anionic binder (JSRAE336, Japan Synthetic Rubber Co., a polyacrylate emulsion) with 2000 parts of water (bath ratio 1:20). The bath temperature was gradually increased to 60° C. and the treatment was carried out for 10 minutes. The treated shirts were rinsed, dehydrated and subjected to the same treatment using Color Dope A as in Example 1.

Then, the above T-shirts were immersed in an anionic aqueous dispersion prepared by mixing 10 parts of an anionic binder (Sofner 395, Asahi Kagaku Kogyo; a polyether modified binder) with 2000 parts of water (bath ratio 1:20). The bath temperature was increased gradually to 60° C. and the treatment was carried out for 10 minutes. There treated shirts were rinsed well, dehydrated and dried using a tumbler at 110° C. for 10 minutes.

The resulting colored T-shirts were examined for agglomeration, color shading, depth of color and laundering fastness. The results were as good as the results obtained in Example 1. The T-shirts were further evaluated in regard to handle, feel and crocking fastness. The results were all satisfactory.

Example 5

One-hundred (100) parts of cotton T-shirts were washed as in Example 1. The T-shirts were then immersed in an anionic compound aqueous dispersion prepared by mixing 10 parts of an anionic compound (Neogen, Dai-Ichi Kogyo Seiyaku, sodium alkylbenzenesulfonate) with 2000 parts of water (bath ratio 1:20). The bath temperature was gradually increased to 60° C. and the treatment was carried out for 10 minutes.

The treated shirts were rinsed, dehydrated and treated with an aqueous dispersion containing Color Dope A in the same manner as in Example 1. Then, the shirts were subjected to the same treatment as Example 1 using an anionic aqueous dispersion containing 10 parts of an anionic compound (polyoxyethylene-dialkyl aryl ether ammonium sulfonate, Hitenol, Dai-Ichi Kogyo Seiyaku Co.) in 2000 parts of water. The treated shirts were rinsed well, dehydrated and tumbler-dried at 110° C. for 10 minutes.

The resulting colored T-shirts were examined for agglomeration, color shading, depth of color and laundering fastness. The results were as good as the results obtained in Example 1. The T-shirts were further evaluated in regard to handle, feel and crocking fastness. The results were all satisfactory.

Example 6

One-hundred (100) parts of cotton T-shirts were washed as in Example 1. The T-shirts were then immersed in an anionic aqueous dispersion prepared by mixing 10 parts of an anionic compound (formalin-condensed naphthalenesulfonic acid) with 2000 parts of water (bath ratio 1:20). The bath temperature was gradually increased to 60° C. and the treatment was carried out for 10 minutes.

The treated shirts were rinsed, dehydrated and treated with an aqueous dispersion containing Color Dope A in the same manner as in Example 3. Then, the shirts were subjected to the same treatment as Example 3 using an aqueous dispersion containing 10 parts of an anionic binder (acrylate resin) in 2000 parts of water. The treated shirts were rinsed well, dehydrated and tumbler-dried at 110° C. for 10 minutes.

The resulting colored T-shirts were examined for agglomeration, color shading, depth of color and laundering fastness. The results were as good as the results obtained in Example 1. The T-shirts were further evaluated in regard to handle, feel and crocking fastness. The results were all satisfactory.

Example 7

In the same manner as Example 4, 100 parts of cotton T-shirts were washed and treated with an aqueous dispersion of an anionic binder and, further, with an aqueous dispersion containing Color Dope A.

The T-shirts were then immersed in a dispersion prepared by mixing 10 parts of an anionic binder (JSRAE336, Japan Synthetic Rubber Co., a polyacrylate emulsion) and 3 parts of an ethyleneurea crosslinking agent (SU-125F, Meisei Kagaku Kogyo Co.) with 2000 parts of water (bath ratio 1:20). The bath temperature was gradually increased to 60°

C. and the treatment was carried out for 10 minutes. The treated shirts were rinsed well, dehydrated and dried using a tumbler at 110° C. for 10 minutes.

The resulting colored T-shirts were examined for agglomeration, color shading, depth of color and laundering fastness. The results were as good as the results obtained in Example 1. The T-shirts were further evaluated in regard to handle, feel and crocking fastness. The results were all satisfactory.

Example 8

One hundred (100) parts of cotton T-shirts were washed in a drum dyeing machine using a detergent (nonionic surfactant)-containing water (bath ratio 1:20), rinsed thoroughly and dehydrated. The T-shirts were then immersed in an aqueous dispersion prepared by mixing 10 parts of color Dope C and 5 parts of an aqueous yellow daylight fluorescent dye dispersion with 2000 parts of water. The bath temperature was increased gradually to 60° C. and the treatment was carried out for 10 minutes, after which the shirts were rinsed and dehydrated.

The same T-shirts were further immersed in an anionic compound aqueous solution prepared by mixing 10 parts of an anionic binder (JSRAE336, Japan Synthetic Rubber; a polyacrylate emulsion) with 2000 parts of water (bath ratio 1:20). The bath temperature was increased gradually to 60° C. and the treatment was carried out for 10 minutes. The treated shirts were rinsed well, dehydrated and tumbler-dried at 110° C. for 10 minutes.

The colored T-shirts were examined for agglomeration, color shading, depth of color and laundering fastness. The results were as good as the results obtained in Example 1. These T-shirts were bright yellow all over at the atmospheric temperature of not less than about 30° C. but turned all over deep black when the atmospheric temperature had dropped to about 25° C. or below. This change of color could occur repeatedly on change of the atmospheric temperature.

Example 9

One hundred (100) parts of cotton T-shirts were washed in a drum dyeing machine using a detergent (nonionic surfactant)-containing water (bath ratio 1:20), rinsed thoroughly and dehydrated. Then, the T-shirts were immersed in an aqueous dispersion containing 10 parts of a cation-treated coloring agent obtained using a green organic photochromic dye in the same manner as the preparation of Color Dope A and 5 parts of an aqueous dispersion of a yellow daylight fluorescent dye in 2000 parts of water. The bath temperature was increased gradually to 60° C. and the treatment was carried out for 10 minutes. The shirts were then rinsed and dehydrated. The T-shirts were further immersed in an anionic aqueous dispersion prepared by mixing 10 parts of an anionic binder (KC. Resin 21E, Kyoken Kasei, a polyacrylate emulsion) with 2000 parts of water (bath ratio 1:20). The bath temperature was increased gradually to 60° C. and the treatment was carried out for 10 minutes.

The treated shirts were rinsed thoroughly, dehydrated and tumbler-dried at 110° C. for 10 minutes. The colored T-shirts thus obtained were examined for agglomeration, color shading, depth of color and laundering fastness. The results were as good as the results obtained in Example 1. These T-shirts were yellow all over in a room not exposed to direct sunlight but brilliant deep green by the window or outdoors. This change of color could occur repeatedly according to the availability of light.

Examples 10–16

One-hundred (100) parts of cotton T-shirts were colored in the same manner as Examples 1–7 except that Color Dope B was used as the cation-treated coloring agent. The colored cotton T-shirts had been colored uniformly and to a good depth just as in Example 1 and were very satisfactory in all of handle, feel, crocking fastness and laundering fastness.

Examples 17–23

One-hundred (100) parts of cotton T-shirts were colored in the same manner as Examples 1–7 except that Color Dope D was used as the cation-treated coloring agent. The colored cotton T-shirts had been colored uniformly and to a deep shade just as in Example 1 and were very satisfactory in all of handle, feel, crocking fastness and laundering fastness.

Examples 24–30

One-hundred (100) parts of cotton T-shirts were colored in the same manner as Examples 1–7 except that Color Dope E was used as the cation-treated coloring agent. The colored cotton T-shirts had been colored uniformly and to a deep shade just as in Example 1 and were very satisfactory in all of handle, feel, crocking fastness and laundering fastness.

Comparison Example 1

Cotton T-shirts were colored by the prior art method.

One-hundred (100) parts of cotton T-shirts were washed in a drum dyeing machine using a detergent (nonionic surfactant)-containing water (bath ratio 1:20), rinsed thoroughly and dehydrated.

Then, the T-shirts were immersed in a dispersion prepared by mixing 10 parts of a cationic compound (Aromafix, Meisei Chemical Works; a cationic water-soluble resin) with 2000 parts of water (bath ratio 1:20). The bath temperature was increased gradually to 60° C. and the cation treatment was carried out for 10 minutes, followed by dehydrating.

Then, the T-shirts were further immersed in a dispersion prepared by mixing 20 parts of the same aqueous color dispersion as used in the preparation of Color Dope B and 10 parts of an anionic compound (Cellogen Proof, Dai-Ichi Kogyo Seiyaku; a specially formulated carboxymethylcellulose) with 2000 parts of water (bath ratio 1:20). The bath temperature was increased gradually to 60° C. and the treatment was carried out for 10 minutes. The treated shirts were rinsed well, dehydrated and tumbler-dried at 110° C. for 10 minutes.

The colored T-shirts thus obtained were examined for agglomeration, color shading, depth of color and laundering fastness. The results are shown in Table 1.

Comparison Example 2

As in Comparison Example 1, 100 parts of cotton T-shirts were washed, cation-treated, rinsed well and dehydrated.

Then, the T-shirts were immersed in an aqueous dispersion prepared by mixing 10 parts of the same aqueous color dispersion as used in the preparation of Color Dope B and 10 parts of a cationic compound (Bonron S-160, Mitsui Toatsu Kagaku; a cationic acrylic resin emulsion) with 2000 parts of water (bath ratio 1:20). The bath temperature was increased gradually to 60° C. and the treatment was carried out for 10 minutes. The treated shirts were rinsed well, dehydrated and tumbler-dried at 110° C. for 10 minutes.

The colored T-shirts thus obtained were examined for agglomeration, color shading, depth of color and laundering fastness. The results are shown in Table 1.

Comparison Example 3

As in Comparison Example 1, 100 parts of cotton T-shirts were washed, cation-treated, rinsed well and dehydrated.

The above T-shirts were treated in the one-dip, one-nip process using a padding dope prepared by mixing 200 parts of the same aqueous color dispersion as used in the preparation of Color Dope B and 300 parts of an anionic compound (Sofner 331, Asahi Kagaku Kogyo; a high molecular dimethyl-type emulsion) with 1500 parts of water (bath ratio 1:15). The treated shirts were dehydrated and tumbler-dried at 110° C. for 10 minutes.

The colored T-shirts thus obtained were examined for agglomeration, color shading, depth of color and laundering fastness. The results are shown in Table 1.

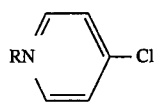

(wherein R represents an alkyl group of 12–18 carbon atoms), (i) said alkylpyridinium chlorides (h) wherein R contains an ether, ester or amide bond, (j) primary amine salts of the formula $RNH_2 \cdot HCl$ (wherein R represents an alkyl group of 8–18 carbon atoms), (k) secondary amine salts of the formula $RNHCH_2CH_2OH$ (wherein R represents an alkyl group of 8–18 carbon atoms), (l) tertiary amine salts of the formula $RN(CH_2CH_2OH)_2$ (wherein R represents an alkyl group of 8–18 carbon atoms), (m) tertiary amine polymers, (n) aminoethylimidazoline hydrochloride, (o) condensates of polyalkylene polyamines with guanidine derivatives, and (p) said primary amines (j), secondary amines (k) and tertiary amines (l) in which R contains an

TABLE 1

|  | Agglomeration and color shading after coloration | Color concentration ΔE value | Laundering fastness ΔE' value | Remarks |
| --- | --- | --- | --- | --- |
| Example 1 | A | 45.7 | 3.3 | Good coloring effect |
| Example 2 | A | 48.2 | 2.5 | Treatment of fabric with an anionic binder results in an increased depth of color. |
| Example 3 | A | 44.1 | 1.1 | Good laundering fastness |
| Comparison Example 1 | C | 28.2 | 15.1 | Because of poor bath exhaustion, the depth of color is inadequate and the loss of color occurs in laundering. |
| Comparison Example 2 | B | 27.4 | 12.2 | There is no cationic binder conducive to laundering resistance. |
| Comparison Example 3 | C | 20.9 | 28.2 | Because of poor bath exhaustion, the depth of color is inadequate and the feel is poor. |

It is apparent that the colored shirts obtained in Comparison Examples 1–3 not only have color shading and agglomeration problems but also are inferior in depth of color and laundering fastness. In contrast, the method of this invention provides for more satisfactory results in all of the aspects.

We claim:

1. A method of pigmenting a cellulosic textile article with a coloring agent characterized by immersing the article in an aqueous dispersion containing a cation-treated coloring agent in the first place, removing water from the article and, then, immersing the same in an aqueous solution or dispersion containing an anionic compound, the cation-treated coloring agent being one prepared by dispersing a coloring agent in an aqueous solution or dispersion of at least one cationic compound selected from the group consisting (a) alkyl-trimethylammonium chlorides of the formula $RN(CH_3)_3Cl$ (where R represents an alkyl group of 12–18 carbon atoms), (b) alkyldimethylbenzylammonium chlorides of the formula $C_6H_5CH_2RN(CH_3)_2Cl$ (wherein R represents an alkyl group of 8–18 carbon atoms), (c) quaternary ammonium salts of acrylic and methacrylic acids, (d) quaternary ammonium salts of polyacrylic and polymethacrylic acids, (e) quaternary ammonium salts of acrylic acid- or methacrylic acid-vinyl compound copolymers, (f) quaternary ammonium salts containing a triazine ring, (g) said alkyltrimethylammonium chlorides (a) or alkyldimethylbenzylammonium chlorides (b) wherein R contains an ether, ester or amide bond (h) alkylpyridium chlorides of the formula ether, ester or amide bond, and (q) cationic urea resin, cationic melamine resin, cationic polyamide resin, cationic cellulosic resin or cationic polyamide-epihalohydrin resin.

2. The pigmenting method of claim 1 wherein the concentration of said cationic compound in said aqueous solution or dispersion thereof is 1 to 50 weight %.

3. The pigmenting method of claim 2 wherein the concentration of said cationic compound in said aqueous solution or dispersion thereof is 10 to 20 weight %.

4. The pigmenting method of claim 1 wherein the aqueous dispersion containing said cation-treated coloring agent is composed of 0.1 to 20 weight % of the cation-treated coloring agent relative to the textile article and 5 to 50 volumes of water relative to the textile article.

5. The pigmenting method of claim 4 wherein the aqueous dispersion containing said cation-treated coloring agent is composed of 0.5 to 10 weight % of the cation-treated coloring agent relative to the textile article and 10 to 30 volumes of water relative to the textile article.

6. The pigmenting method of claim 1 wherein the anionic compound is at least one member selected from the group consisting of higher alcohol sulfate ester salts, akylarylsulfonic acid salts, maleic acid- or maleic anhydridevinyl compound copolymers and urethane resins.

7. The pigmenting method of claim 1 wherein the anionic compound is at least one member selected from the group consisting of acrylate resin emulsions and urethane resin emulsions.

8. The pigmenting method of claim 1 wherein the aqueous solution or dispersion of anionic compound is composed of 1 to 50 weight % of the anionic compound relative to the textile article and 5 to 50 volumes of water relative to the textile article.

9. The pigmenting method of claim 8 wherein the aqueous solution or dispersion of anionic compound is comprised of 5 to 15 weight % of the anionic compound relative to the textile article and 10 to 30 volumes of water relative to the textile article.

10. A method of pigmenting a cellulosic textile article with a coloring agent characterized by immersing a cellulosic textile article in an aqueous solution or dispersion of an anionic compound in the first place, removing water from the article, immersing the same in a cation-treated coloring agent, removing water from the article and finally immersing it in an aqueous solution or dispersion of an anionic compound, the cation-treated coloring agent being one prepared by dispersing a coloring agent in an aqueous solution or dispersion of a cationic compound selected from the group consisting of (a) alkyltrimethylammonium chlorides of the formula $RN(CH_3)_3Cl$ (where R represents an alkyl group of 8–18 carbon atoms), (b) alkyldimethylbenzylammonium chlorides of the formula $C_6H_5CH_2RN(CH_3)_2Cl$ (wherein R represents an alkyl group of 12–18 carbon atoms), (c) quaternary ammonium salts of acrylic and methacrylic acids, (d) quaternary ammonium salts of polyacrylic and polymethacrylic acids, (e) quaternary ammonium salts of acrylic acid- or methyacrylic acid-vinyl compound copolymers (f) quaternary ammonium salts containing a triazine ring, (g) said alkyltrimethylammonium chlorides (a) or alkyldimethyl-benzylammonium chlorides (b) wherein R contains an ether, ester or amide bond, (h) alkylpyridinium chlorides of the formula

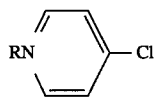

(wherein R represents an alkyl group of 12–18 carbon atoms), (i) said alkylpyridinium chlorides (h) wherein R contains an ether, ester or amide bond, (j) primary amine salts of the formula $RNH_2 \cdot HCl$ (wherein R represents an alkyl group of 8–18 carbon atoms), (k) secondary amine salts of the formula $RFHCH_2CH_2OH$ (wherein R represents an alkyl group of 8–18 carbon atoms), (l) tertiary amine salts of the formula $RN(CH_2CH_2OH$ (wherein R represents an alkyl group of 8–18 carbon atoms), (m) tertiary amine polymers, (n) aminoethylimidazoline hydrochloride, (o) condensates of polyalkylene polyamines with guanidine derivatives, (p) said primary amines (j) secondary amines (k) and tertiary amines (1) in which R contains an ether, ester or amide bond, and (q) cationic urea resin, cationic melamine resin, cationic polyamide resin, cationic cellulosic resin or cationic polyamide-epihalohydrin resin.

11. The pigmenting method of claim 10 wherein the concentration of said cationic compound in said aqueous solution or dispersion thereof is 1 to 50 weight %.

12. The pigmenting method of claim 11 wherein the concentration of said cationic compound in said aqueous solution or dispersion thereof is 10 to 20 weight %.

13. The pigmenting method of claim 10 wherein the aqueous dispersion containing said cation-treated coloring agent is composed of 0.1 to 20 weight % of the cation-treated coloring agent relative to the textile article and 5 to 50 volumes of water relative to the textile article.

14. The pigmenting method of claim 13 wherein the aqueous dispersion containing said cation-treated coloring agent is composed of 0.5 to 10 weight % of the cation-treated coloring agent relative to the textile article and 10 to 30 volumes of water relative to the textile article.

15. The pigmenting method of claim 10 wherein the anionic compound is at least one member selected from the group consisting of higher alcohol sulfate ester salts, alkylarylsulfonic acid salts, maleic acid or maleic anhydridevinyl compound copolymers and urethane resins.

16. The pigmenting method of claim 10 wherein the anionic compound is at least one member selected from the group consisting of acrylate resin emulsions and urethane resin emulsions.

17. The pigmenting method of claim 10 wherein the aqueous solution or dispersion of anionic compound is composed of 1 to 50 weight % of the anionic compound relative to the textile article and 5 to 50 volumes of water relative to the textile article.

18. The pigmenting method of claim 17 wherein the aqueous solution or dispersion of anionic compound is composed of 5 to 15 weight % of the anionic compound relative to the textile article and 10 to 30 volumes of water relative to the textile article.

* * * * *

UNITED STATES PATENT AND TRADEMARK OFFICE
CERTIFICATE OF CORRECTION

PATENT NO.   : 5,478,361
DATED        : December 26, 1995
INVENTOR(S)  : SUMII, et al It is certified that error appears in the above-indentified patent and that said Letters Patent is hereby corrected as shown below:

Column 3, line 16, change "$H_2 \cdot HCl$" to --$RNH_2 \cdot HCl$--.

Column 13, line 15, after "same in" insert --an aqueous dispersion containing--.

Column 13, line 46, change "$RFHCH_2CH_2OH$" to --$RNHCH_2CH_2OH$--.

Column 14, line 1, change "$RN(CH_2CH_2OH$" to --$RN(CH_2CH_2OH)_2$--.

Signed and Sealed this

Ninth Day of July, 1996

Attest:

BRUCE LEHMAN

*Attesting Officer*   Commissioner of Patents and Trademarks